J. W. WHITE

June 7, 1932. STOPLIGHT SWITCH Re. 18,487

Original Filed April 17, 1926

Inventor

JOHN W. WHITE

By Clarence E. Walker.

His Attorney

Reissued June 7, 1932 Re. 18,487

UNITED STATES PATENT OFFICE

JOHN W. WHITE, OF DETROIT, MICHIGAN, ASSIGNOR TO KELSEY-HAYES WHEEL CORPORATION, OF DETROIT, MICHIGAN, A CORPORATION OF NEW YORK

STOPLIGHT SWITCH

Original No. 1,744,940, dated January 28, 1930, Serial No. 102,701, filed April 17, 1926. Application for reissue filed June 29, 1931. Serial No. 547,759.

This invention relates to an improvement in a stop light intended to be mounted upon a motor vehicle equipped with a hydraulic or fluid pressure braking system.

The stop light itself is generally recognized as a very important accessory and while no particular difficulty was experienced in installing it on a motor vehicle having mechanically applied brakes considerable difficulty has previously been experienced in installing it on motor vehicles having hydraulic or fluid pressure braking systems.

The growth in the use of hydraulic fluid pressure brake systems has created a demand for a simpler form of stop light actuating mechanism and the primary object of this invention is to satisfy this demand by providing a stop light which is operated by any change in pressure in the lines of the hydraulic or fluid pressure system, so as to indicate to an observer that some such change in the system is taking place.

Other objects of this invention will appear from a consideration of the following description taken in connection with the drawing which forms a part thereof, and in which Figure 1 is a perspective view illustrating the application of this invention to one form of a fluid pressure braking system in which the brake is applied by depressing a piston in a cylinder, the braking piston and cylinder being shown in section;

Figure 1:
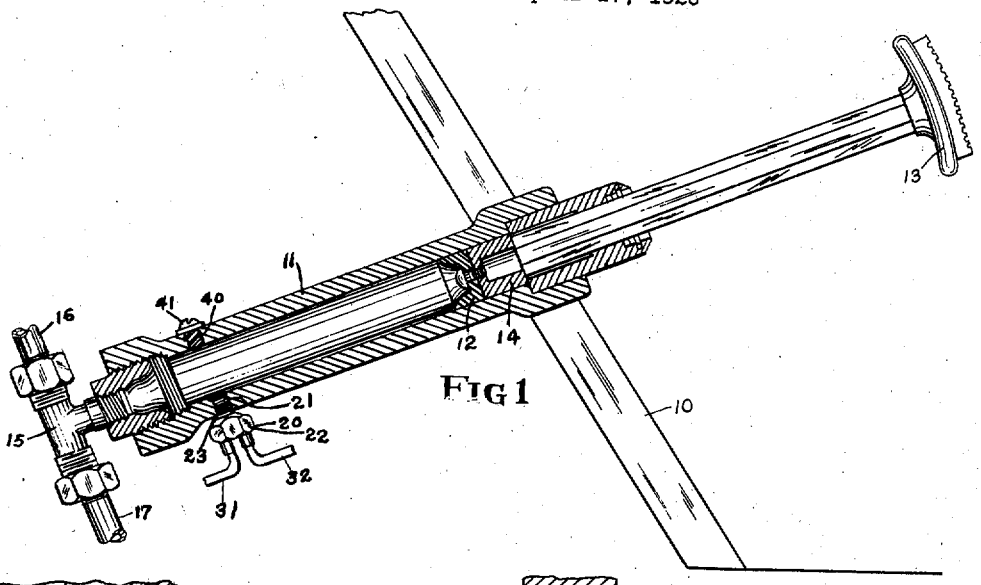
Figure 2:
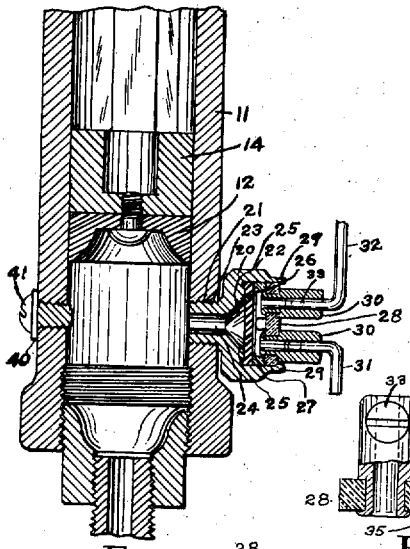
Figure 2 is an enlarged sectional view of a portion of the braking cylinder illustrating the attachment of the stop light switch thereto.

In the present drawing is illustrated the application of this stop light to a hydraulic brake pedal, such as is shown in my copending application Serial No. 49,391, filed August 10, 1925. It will be clearly understood, however, that the switch shown attached to the cylinder can be attached equally well to any other part of the system, and that it will respond to any increase in pressure which may be set up for some reason or other in the system.

In the drawing, the reference numeral 10 is employed to designate the floor board of a motor vehicle, in which is mounted at the proper angle a brake cylinder 11. In the cylinder 11 is mounted a piston 12, which is caused to move downwardly in the cylinder by the application of pressure to the foot piece 13 of the piston plunger 14. From an examination of the construction shown in the drawing and from the description of the mechanism which will be found in my copending application, it is of course clear that when the plunger 14 descends pressure is created in the chamber 11 and transmitted through the coupling 15 to the brake lines 16 and 17.

The switch or control for the stop light is designated generally by the numeral 20 and may be mounted in an internally threaded hole 21 through the side wall of the cylinder 11. The switch 20 comprises a cuplike casing 22 terminating in an externally threaded sleeve 23 mounted in the hole 21. The inside of the cup is connected to the interior of the cylinder by means of a passage 24 through the sleeve, the outer end of which is enlarged to form a mouth 25. Across the mouth 25 is fixed a flexible diaphragm 26 suitably clamped in position by a ring 27 resting upon the outer periphery of the diaphragm 26 and held in contact therewith by means of a disc 28, which is secured in the cup 22 by peening over the outer edge 29 of the cup.

Figure 3:
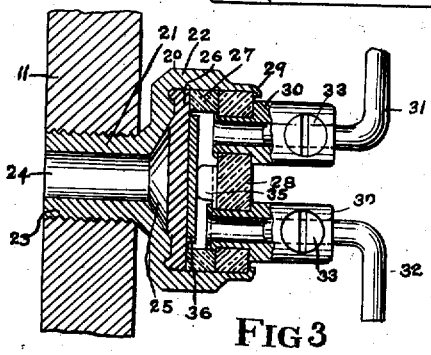
Figure 3 is an enlarged view of the stop light switch showing the parts in the idle position.
Figure 7:
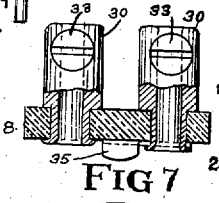
Figure 7 is a view partly in section illustrating the manner in which the terminals are mounted on the disc.
Figure 4:
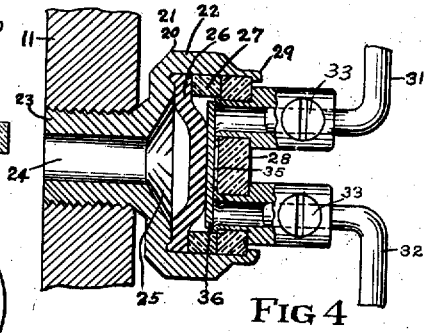
Figure 4 is a similar view of the switch showing the parts in the operative position.
Figure 5:
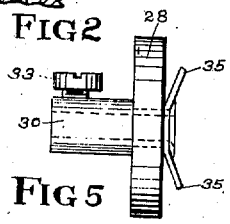
Figure 5 is a side elevation of the disc which forms a part of the switch.
Figure 6:
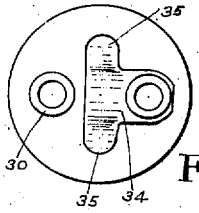
Figure 6 is a bottom plan view of the disc.

Fixed to the disc 28 are terminals 30 of metal which receive the wire 31 leading from the battery and the wire 32 leading to the stop light (not shown). A suitable set screw 33 is provided in each terminal to hold the wires in place. One of the terminals 30, preferably that receiving the wire 31 from the battery, is peened over against the inner face of the disc 28 and is thus securely fixed in place. Over the end of the other terminal 30 is passed a spring clip 34 which will be clamped against the inner face of the disc when the terminal is fixed in place by peening over the end of the terminal as shown in Figs. 3 and 4. The clip 34 has two outwardly projecting ends 35 and resting loosely upon the diaphragm 26 is a metal plate 36, which is held against the diaphragm at all times by the tips 35 of the clip 34. Conditions may arise which render it desirable that the switch 20 be installed on the other side of the cylinder 11. For that reason, a second hole 40 diametrically opposite the hole 23 is drilled and tapped, being closed by the screw 41.

Obviously, when parts are in the position shown in Figure 3, there is no connection between the terminals 30. When, however, the plunger 14 is depressed and pressure is created in the cylinder 11, that pressure causes the diaphragm 26 to be distorted as shown in Fig. 4, raising the plate 36 until it contacts with both the terminals. When this takes place the current passes from the battery to the stop light through the switch and illumines the latter in the usual manner.

While one embodiment of this invention has been shown and described as applied to a braking system, applicant is not limited thereto, since it is obvious that other embodiments can be made applicable to this particular system or to other fluid operated systems without departing from the spirit and scope of this invention as set forth in the following claims:

Having thus set forth my invention, what I claim as new and for which I desire protection by Letters Patent is:

1. A fluid operated switch comprising a cup like casing having a passage leading into the interior thereof, and adapted to contain fluid, a diaphragm in said casing extending across and sealing said passage, a ring bearing against the periphery of said diaphragm to secure it in place, a disc resting upon said ring and fixed in said casing by peening over the edge of said casing, a metal plate in said ring resting freely against said diaphragm, a spring carried by said disc and holding said plate in position against said diaphragm, and terminals projecting through said disc into said casing, into contact with the projecting ends of which said terminals said plate is brought by the flexing of said diaphragm under the influence of fluid in said passage.

2. In a fluid operated switch, a cup like casing having a passage leading into the interior thereof and adapted to contain fluid, a disc fixed in the outer edge of said casing, a diaphragm fixed in said casing across said passage, terminals projecting through said disc into said casing, a metal plate in said casing resting freely against said diaphragm and a spring carried by said disc holding said plate against said diaphragm and out of contact with said terminals, said plate being brought into contact with the projecting ends of said terminals by the flexing of said diaphragm under the influence of fluid in said passage.

3. A fluid operated switch comprising a cup like casing having a passage leading into the interior thereof and adapted to contain fluid, an insulator head inserted in said cup, spaced terminals mounted upon and extending through said insulator head with inwardly projecting contact portions, a circuit closing member within said cup movable by fluid pressure in said passage into connection with said terminal contacts, and a flange on said cup peened over said insulator head to retain the parts in assembled relation and to limit the movement of said circuit closing member.

4. A fluid operated switch comprising a cup like casing having a passage leading into the interior thereof and adapted to contain fluid, an insulator head inserted in said casing, spaced terminals mounted upon and extending through said insulator head with inwardly projecting contact portions and a resilient circuit closing diaphragm extending across within said cup and adapted to be actuated by the fluid pressure therein into connection with said terminal contacts, and a flange on said cup peened over said insulator head to retain the parts in assembled relation and to limit the flexing of said diaphragm.

5. A fluid operated switch comprising a cup like casing having an external polygonal form and provided with a screw threaded nipple with a passage leading therethrough into the interior of the cup and adapted to contain fluid, an insulator head with inwardly projecting contact portions and a resilient circuit closing diaphragm extending across within said cup and adapted to be actuated by the fluid pressure therein into connection with said terminal contacts, and a flange on said cup peened over said insulator head to retain the parts in assembled relation and to limit the flexing of said diaphragm.

In testimony whereof I affix my signature.

JOHN WILLIAM WHITE.